US008755353B2

(12) United States Patent
Lu

(10) Patent No.: US 8,755,353 B2
(45) Date of Patent: Jun. 17, 2014

(54) METHOD OF CONTROLLING THE CONNECTION OF STATION AND ACCESS POINTS

(75) Inventor: Tan-Chun Lu, New Taipei (TW)

(73) Assignee: Accton Technology Corporation, Hsinchu (TW)

( * ) Notice: Subject to any disclaimer, the term of this patent is extended or adjusted under 35 U.S.C. 154(b) by 56 days.

(21) Appl. No.: 13/305,506

(22) Filed: Nov. 28, 2011

(65) Prior Publication Data

US 2012/0327898 A1    Dec. 27, 2012

(51) Int. Cl.
*H04W 4/00*    (2009.01)

(52) U.S. Cl.
USPC ............ 370/331; 370/254; 370/332; 370/338

(58) Field of Classification Search
USPC .................................. 370/331, 338, 332, 254
See application file for complete search history.

(56) References Cited

U.S. PATENT DOCUMENTS

| | | | | |
|---|---|---|---|---|
| 5,640,677 A * | 6/1997 | Karlsson | ....................... | 455/434 |
| 6,587,680 B1 * | 7/2003 | Ala-Laurila et al. | ........... | 455/411 |
| 6,609,003 B1 * | 8/2003 | Park et al. | ..................... | 455/436 |
| 7,769,380 B2 * | 8/2010 | Abu-Amara | ............... | 455/435.1 |
| 7,805,140 B2 * | 9/2010 | Friday et al. | .................. | 455/436 |
| 7,844,057 B2 * | 11/2010 | Meier et al. | .................... | 380/270 |
| 7,873,352 B2 * | 1/2011 | Nguyen et al. | ................ | 455/411 |
| 7,873,360 B2 * | 1/2011 | Park et al. | ...................... | 455/442 |
| 7,903,611 B2 * | 3/2011 | Wu et al. | ....................... | 370/331 |
| 8,233,450 B2 * | 7/2012 | Zaki et al. | ..................... | 370/331 |
| 8,249,256 B2 * | 8/2012 | Korus et al. | .................... | 380/272 |
| 2004/0240412 A1 * | 12/2004 | Winget | ......................... | 370/331 |
| 2005/0143065 A1 * | 6/2005 | Pathan et al. | .............. | 455/432.1 |
| 2005/0175009 A1 * | 8/2005 | Bauer | ............................ | 370/390 |
| 2006/0072507 A1 * | 4/2006 | Chandra et al. | ............... | 370/332 |
| 2006/0092883 A1 * | 5/2006 | Lee et al. | ...................... | 370/332 |
| 2006/0268756 A1 * | 11/2006 | Wang et al. | .................... | 370/310 |
| 2008/0186933 A1 * | 8/2008 | Willman et al. | .............. | 370/338 |
| 2010/0091669 A1 * | 4/2010 | Liu et al. | ....................... | 370/252 |
| 2011/0194532 A1 * | 8/2011 | Kakkad | ......................... | 370/331 |

* cited by examiner

*Primary Examiner* — Ricky Ngo
*Assistant Examiner* — Dewanda Samuel
(74) *Attorney, Agent, or Firm* — Tracy M. Heims; Apex Juris, pllc

(57) ABSTRACT

A method of controlling a connection of a station to different access points (AP) in roaming, in which the station is connected to a first AP through identification of basic service set context (BSS context), includes the following steps: a) Obtain received signal strength indications (RSSI) between the station and each access point. b) Copy the BSS context of the first AP to a second AP when the RSSI between the station and the first AP is less than RSSI between the station and the second AP; and c) disconnect the station from the first AP, and automatically connect the station to the second AP which has the same BSS context.

9 Claims, 4 Drawing Sheets

METHOD OF CONTROLLING THE CONNECTION OF STATION AND ACCESS POINTS

BACKGROUND OF THE INVENTION

1. Field of the Invention

The present invention relates generally to a wireless telecommunication, and more particularly to a method of controlling the connection of a station to different access points in roaming.

2. Description of the Related Art

Because of the popularity of the application of wireless telecommunication, more and more people use wireless telecommunication for connection to network, communication by phone, or data transmission. Typically, the station at user end usually transmits data through wireless communication with access points (AP). However, the coverage of each AP is limited that the station far away from the AP may not receive the signals and loss the connection with the AP when there is only one AP in a large area or in buildings.

Therefore, it must provide several APs in a large area or in buildings that the station may keep the connection with the AP in roaming to avoid unexpected disconnection.

The roaming still has some drawbacks. For example, the station will cut the connection with the original AP off first when it senses a weak signal therebetween, and then, scan the signal strengths of the APs in each channel. Take IEEE 802.11g for example, the client end has to scan eleven channels in sequence. Suppose that it needs 0.1 second to scan one channel, it will take more than 1.1 seconds to finish the scan of the eleven channels. Besides, it still needs to authenticate or exchange pairwise key through 4-way hand shaking to complete the connection to a new AP after scan. It is obvious that the conventional device needs much of time in roaming and it might lead to delay of the data transmission, especially relative to the real-time application, such as voice and multimedia transmission application.

An improved network based on control and provisioning of wireless access points (CAPWAP) provides an access controller (AC) to manage the APs and scan the signal strength of the signals received from the APs. However, it still needs time for authentication, or pairwise key exchange through 4-way hand shaking which means that it still delays the data transmission in moaning.

In conclusion, it still needs to improve the conventional connection control.

SUMMARY OF THE INVENTION

The primary objective of the embodiment of present invention is to provide a method of controlling a connection of a station to access points, which may reduce the delay of data transmission in roaming.

According to the objective of the embodiment of the present invention, a method of controlling a connection of a station and access points, wherein the access points include a first access point and a second access point, and the station is connected to the first access point by identifying a basic service set context of the first access point, the method includes the steps of:

a) Obtain a received signal strength indication between the station and the first access point and a received signal strength indication between the station and the second access point.

b) Copy the basic service set context of the first access point to the second access point when the received signal strength indication between the station and the first access point is less than the received signal strength indication between the station and the second access point.

c) Disconnect the station from the first access point.

Therefore, the time for roaming would be shortened by the method of the embodiment of the present invention.

DETAILED DESCRIPTION OF THE INVENTION

Figure 1:
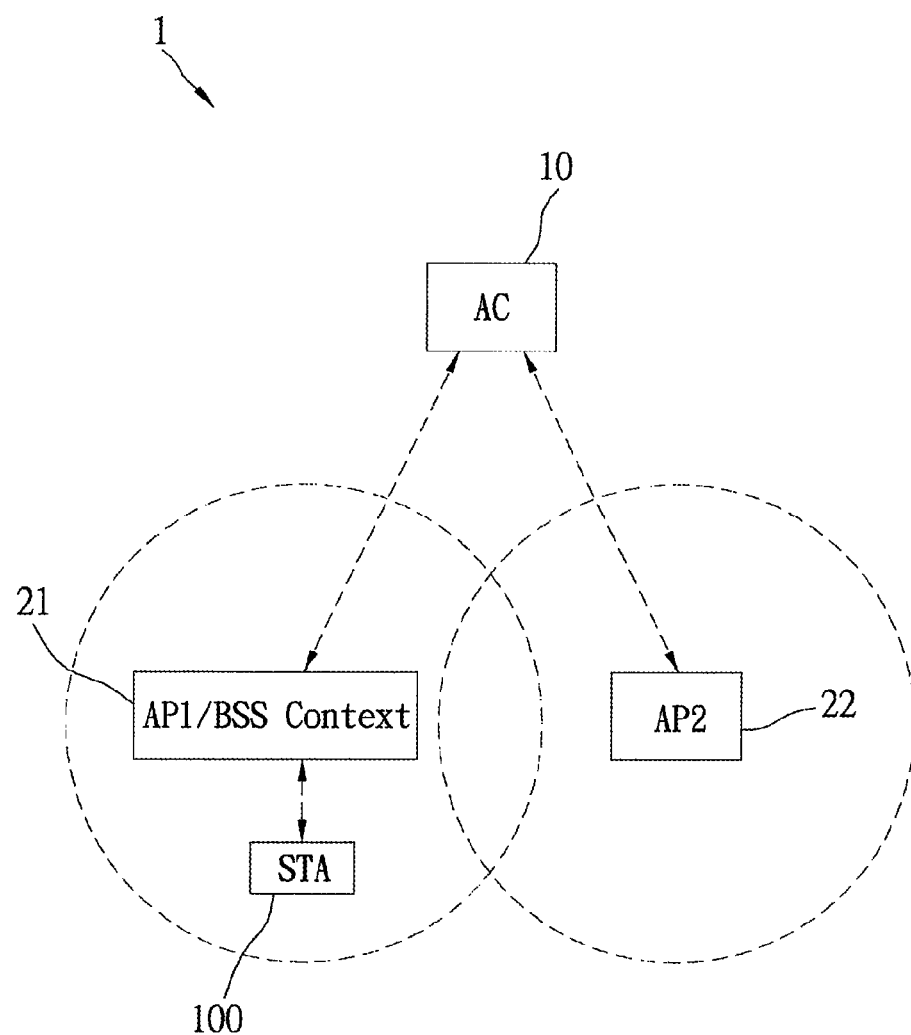
FIG. 1 is a block diagram of a preferred embodiment of the present invention.

FIG. 1 shows a wireless environment 1 of the preferred embodiment of the present invention for wireless telecommunication. In the embodiment, the wireless environment 1 is based on control and provisioning of wireless access points (CAPWAP), in which a station 100, an access controller (AC) 10, and a plurality of access points (AP) are provided. We only show two APs, a first AP 21 and a second AP 22, in drawings. In the embodiment, the station 100 is a smartphone, and, however, it may be a PC, laptop, personal data assistance (PDA), or other mobile devices capable of wireless telecommunication.

Typically, each AP 21, 22 has a plurality of virtual access points to identify a basic service set context (BSS context) stored in the virtual access point when the station 100 is connected to the AP 21 to examine that whether the target of connection and data transmission are correct. The BSS context includes a basic service set ID (BSSID), a unicast key, a broadcast key, a sequence number, and other data for authentication of connection. If the station 100 is located in the network environment 1 and in a coverage of the first AP 21, the station 100 is connected to the first AP 21 after identification of the BSS context in the virtual access point of the first AP 21.

Figure 2:
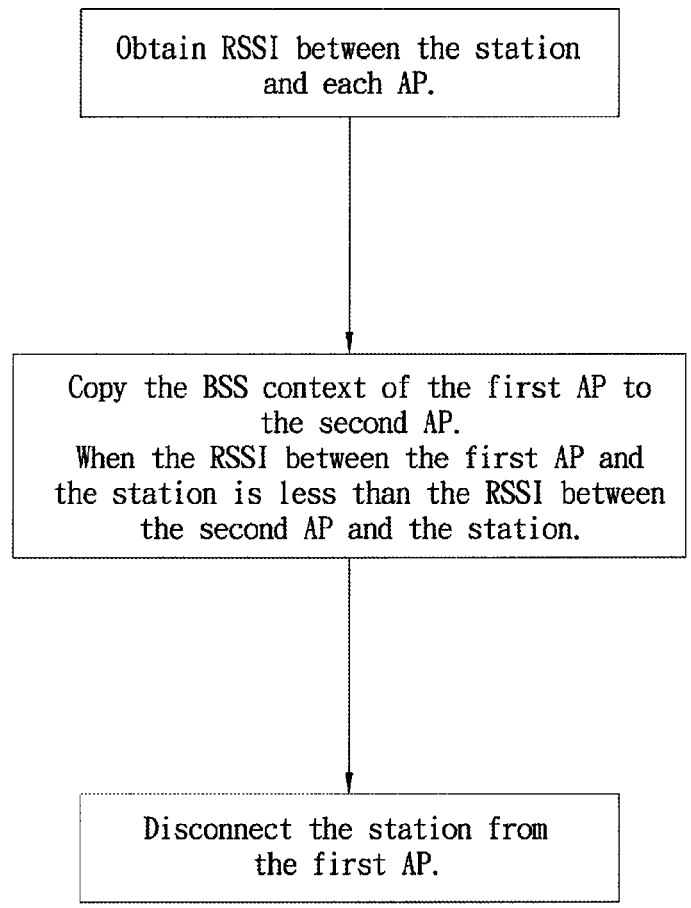
FIG. 2 is a flow chart of the control method of the preferred embodiment of the present invention.

As shown in FIG. 2, a method of controlling a connection of the station 100 and the APs 21, 22 includes the following steps:

A. Obtain received signal strength indications (RSSI) between the station 10 and each AP 21, 22. For example, if the RSSI between the station 10 and the first AP 21 is less than a predetermined value, such as −70 dBm to −90 dBm, the first AP 21 will tell the AC 10 that the signal therebetween is too weak, and the AC 10 will inform the second AP 22, which is the AP close to the first AP 21, to provide the RSSI between the second AP and the station 10. The RSSI is a signal strength of a packet that the station 100 receives it from the AR The RSSI is an index of the connection quality between the station 100 and AR In the present embodiment, RSSI may be a signal strength of a packet that the AP receives it from the station 100 also.

Figure 3:
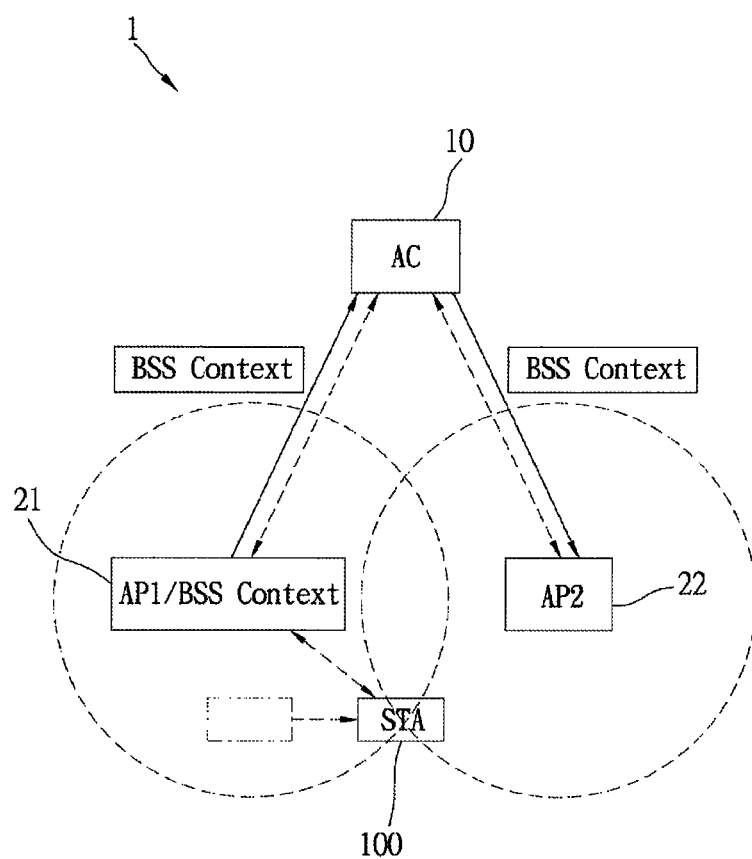
FIG. 3 is a sketch diagram of the preferred embodiment of the present invention, showing the station moving to the second AP.

B. Copy the BSS context of the first AP 21 to the second AP 22 when the RSSI between the first AP 21 and the station 100 is less than the RSSI between the second AP 22 and the station 100. For example, as shown in FIG. 3, the RSSI between the first AP 21 and the station 100 will be decreasing and the RSSI between the second AP 22 and the station 100 will be increasing when the station 100 moves from the coverage of the first AP 21 to the coverage of second AP 22. When the RSSI between the first AP 21 and the station 100 is less than the predetermined value and/or the RSSI between the second AP 22 and the station 100 is greater than the predetermined value, the AC 10 copies the BSS context stored in the virtual access point of the first AP 21 to the second AP 22 to overwrite the BSS context stored in the virtual access point of the second AP 22 or to insert it in another virtual access point of the second AP 22.

Figure 4:
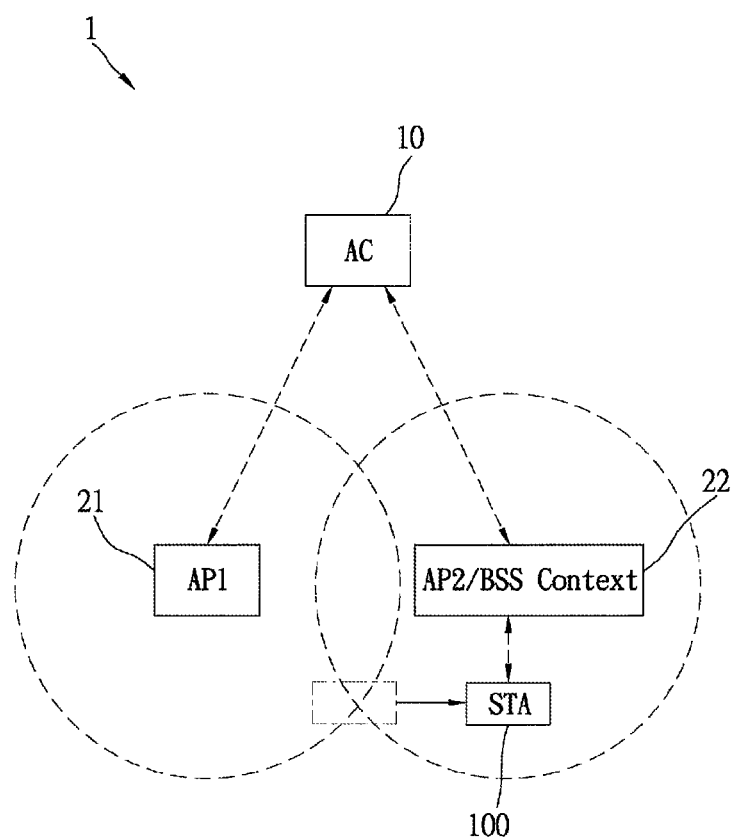
FIG. 4 is a sketch diagram of the preferred embodiment of the present invention, showing the station connected to the second AP.

C. Disconnect the station 100 from the first AP 21. As shown in FIG. 4, after the connection between the first AP 21 and the station 100 is cut off, the station 100 may be directly connected to the second AP 22, which has the same BSS context as the first AP 21.

The present invention provides a fast roaming way by copying the BSS context of the first AP 21 to the second AP 22 when the station 100 leaves the coverage of the first AP 21 and enters the coverage of the second AP 22 that the station 100 may be directly connected to the second AP 22 without the conventional procedures, such as scanning the signal strength in each channel, authentication, pairwise key exchange etc. In the present invention, the time of switching the APs is very short.

It has to be noted that there may be more than two APs in the network environment 1. The network environment 1 of the present invention may be based on any protocol other than CAPWAP. Any device or process to switch the connection of the station to different AP by copying the BSS context will be still in the scope of the claim of the present invention.

What is claimed is:

1. A method of controlling a connection of a station and access points, wherein the access points include a first access point and a second access point, and the station is connected to the first access point by identifying a basic service set context of the first access point, the method comprising the steps of:
   a) obtaining a received signal strength indication between the station and the first access point, and a received signal strength indication between the station and the second access point;
   b) copying the basic service set context of the first access point to the second access point when the received signal strength indication between the station and the first access point is less than the received signal strength indication between the station and the second access point;
   c) disconnecting the station from the first access point; and
   wherein the basic service set context of the first access point is copied to the second access point in the step b if the received signal strength indications of the first access point is less than a predetermined value, and the received signal strength indications of the second access point is greater than the predetermined value.

2. The method as defined in claim 1, wherein the received signal strength indication between the station and the access point in the step a is obtained by detecting a signal strength of a packet that the access point receives it from the station.

3. The method as defined in claim 1, wherein the basic service set context of the first access point is copied to the second access point in the step b when the station moves to a coverage of the second access point from a coverage of the first access point.

4. The method as defined in claim 1, wherein the predetermined value is in a range between −70 dBm and −90 dBm.

5. The method as defined in claim 1, wherein the steps are executed by an access controller of control and provisioning of wireless access points (CAPWAP).

6. The method as defined in claim 1, wherein the received signal strength indication is a signal strength of a packet that the access point receives it from the station.

7. The method as defined in claim 1, wherein the received signal strength indication is a signal strength of a packet that the station receives it from the access point.

8. The method as defined in claim 1, wherein the basic service set context includes at least one of a basic service set ID (BSSID), a unicast key, a broadcast key, and a sequence number.

9. A method of controlling a connection of a station and access points, wherein the access points include a first access point and a second access point, and the station is connected to the first access point by identifying a basic service set context of the first access point, the method comprising the steps of:
   a) obtaining a received signal strength indication between the station and the first access point, and a received signal strength indication between the station and the second access point;
   b) copying the basic service set context of the first access point to the second access point when the received signal strength indication between the station and the first access point is less than the received signal strength indication between the station and the second access point;
   c) disconnecting the station from the first access point; and
   wherein each of the access points has a plurality of virtual access points, and the basic service set context is stored in one of the virtual access points of the first access point, and the basic service set context of the first access point is copied to one of the virtual access points of the second access point in the step b.

* * * * *